(12) United States Patent
Takeda

(10) Patent No.: US 10,052,678 B2
(45) Date of Patent: Aug. 21, 2018

(54) WORKPIECE CONVEYING APPARATUS FOR A PRESSING MACHINE

(71) Applicant: AIDA ENGINEERING, LTD., Sagamihara-shi, Kanagawa (JP)

(72) Inventor: Keisuke Takeda, Sagamihara (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 255 days.

(21) Appl. No.: 14/835,546

(22) Filed: Aug. 25, 2015

(65) Prior Publication Data

US 2016/0059300 A1 Mar. 3, 2016

(30) Foreign Application Priority Data

Aug. 29, 2014 (JP) ................................. 2014-174859

(51) Int. Cl.
| | |
|---|---|
| *B21J 13/10* | (2006.01) |
| *B21D 43/05* | (2006.01) |
| *B21D 43/10* | (2006.01) |
| *B25J 9/00* | (2006.01) |
| *B25J 9/04* | (2006.01) |
| *B25J 11/00* | (2006.01) |

(52) U.S. Cl.
CPC ............ *B21J 13/10* (2013.01); *B21D 43/052* (2013.01); *B21D 43/105* (2013.01); *B25J 9/0018* (2013.01); *B25J 9/046* (2013.01); *B25J 11/00* (2013.01)

(58) Field of Classification Search
CPC ... B21J 13/10; B25J 11/00; B25J 9/046; B25J 9/0018; B21D 43/052; B21D 43/105
See application file for complete search history.

(56) References Cited

FOREIGN PATENT DOCUMENTS

| | | |
|---|---|---|
| DE | 102005045153 A1 | 3/2006 |
| JP | 04-047829 U1 | 4/1992 |
| JP | 07-116754 A | 5/1995 |
| JP | 2001-030190 A | 2/2001 |
| JP | 2002-200587 A | 7/2002 |
| JP | 2006-123009 A | 5/2006 |
| JP | 2006-281269 A | 10/2006 |
| JP | 2009-95940 A | 5/2009 |
| WO | 2008/074836 A1 | 6/2008 |

OTHER PUBLICATIONS

European Search Report EP Application No. 15180620.5 dated Mar. 3, 2016.

(Continued)

*Primary Examiner* — Michael S Lowe
(74) *Attorney, Agent, or Firm* — McDermott Will & Emery LLP

(57) ABSTRACT

The workpiece conveying apparatus for a pressing machine includes: a rotary base rotatable about a substantially perpendicular axis; a first arm pivotally supported by the rotary base so as to be rockable within a substantially perpendicular plane; a coupler pivotally supported on a distal end side of the first arm so as to be rockable; a second arm having a proximal end side that is mounted to the coupler so as to be rockable; a cross bar mounted to a distal end side of the second arm so as to be rockable within a plane substantially parallel to a rocking plane of the second arm; and a workpiece holding device mounted to the cross bar.

5 Claims, 17 Drawing Sheets

(56) References Cited

OTHER PUBLICATIONS

Office Action Japanese Patent Application No. 2014-174859 dated Jan. 5, 2016.
Office Action Japanese Patent Application No. 2014-174859 dated Jan. 5, 2016, with English language translation.
Chinese Office Action issued in corresponding Chinese Patent Application No. 201510498446.6, dated Jan. 3, 2018, with English Translation.

WORKPIECE CONVEYING DIRECTION

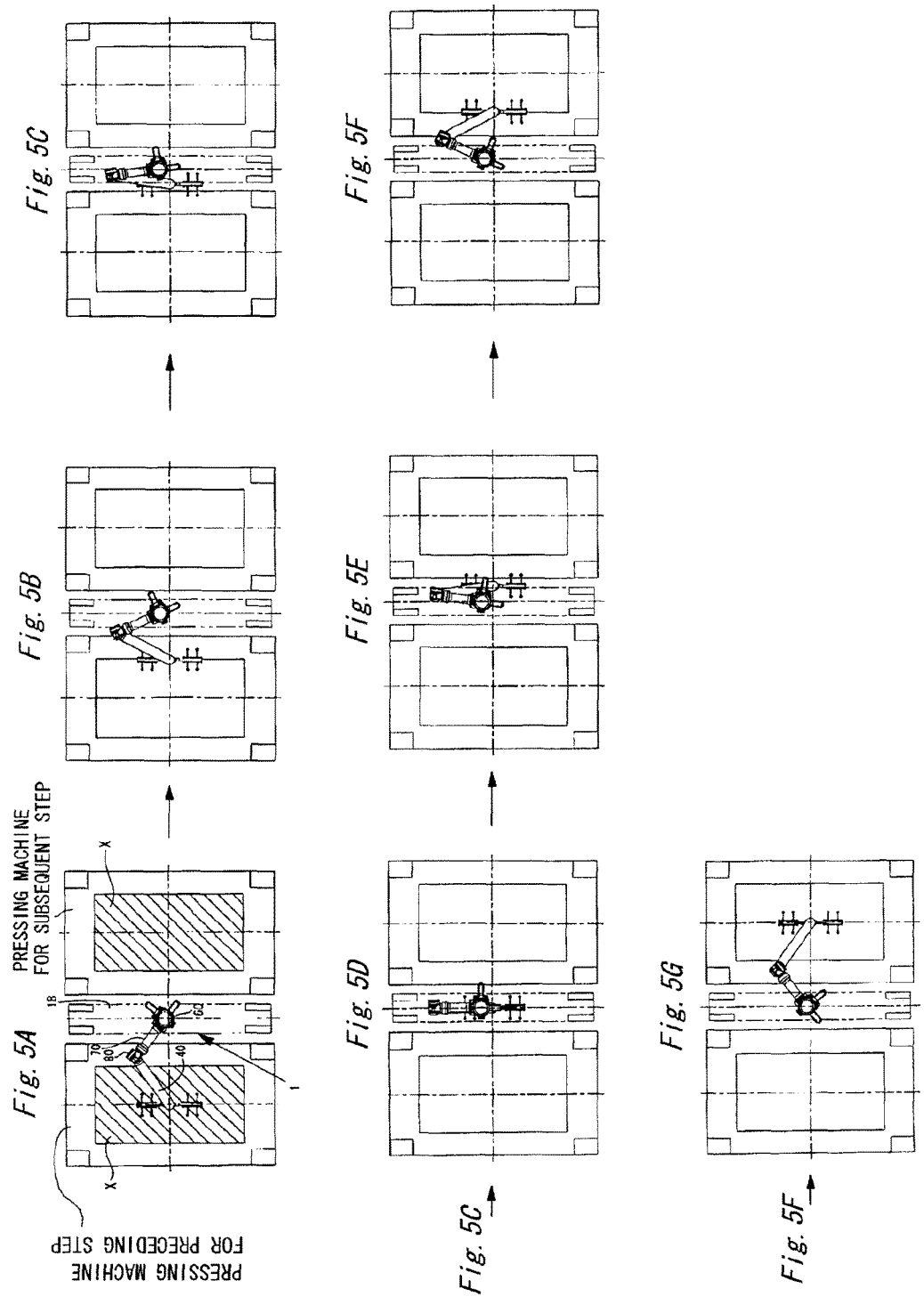

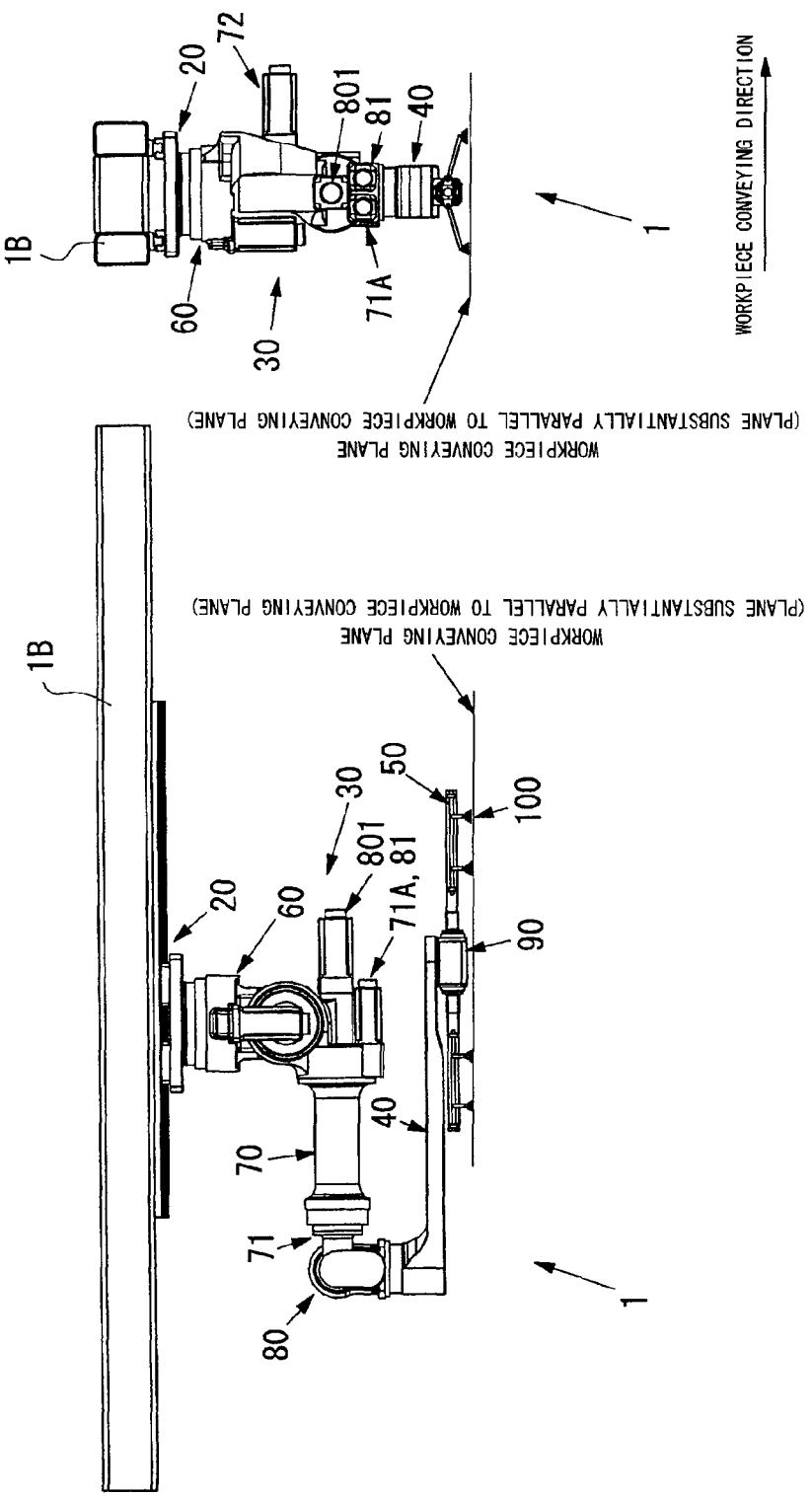

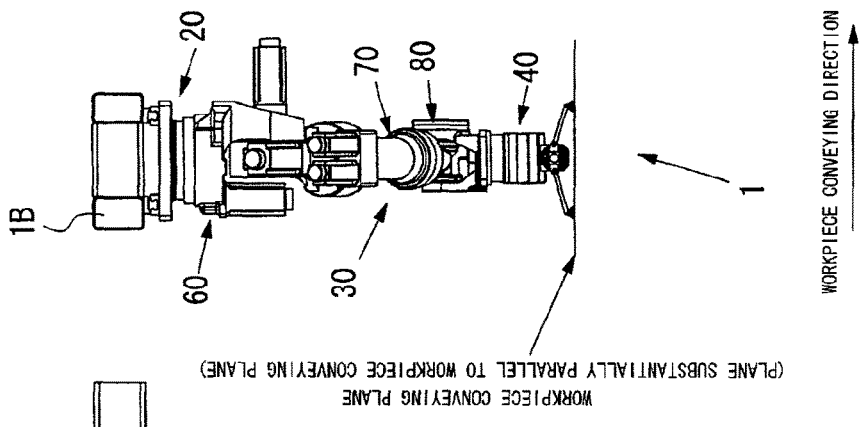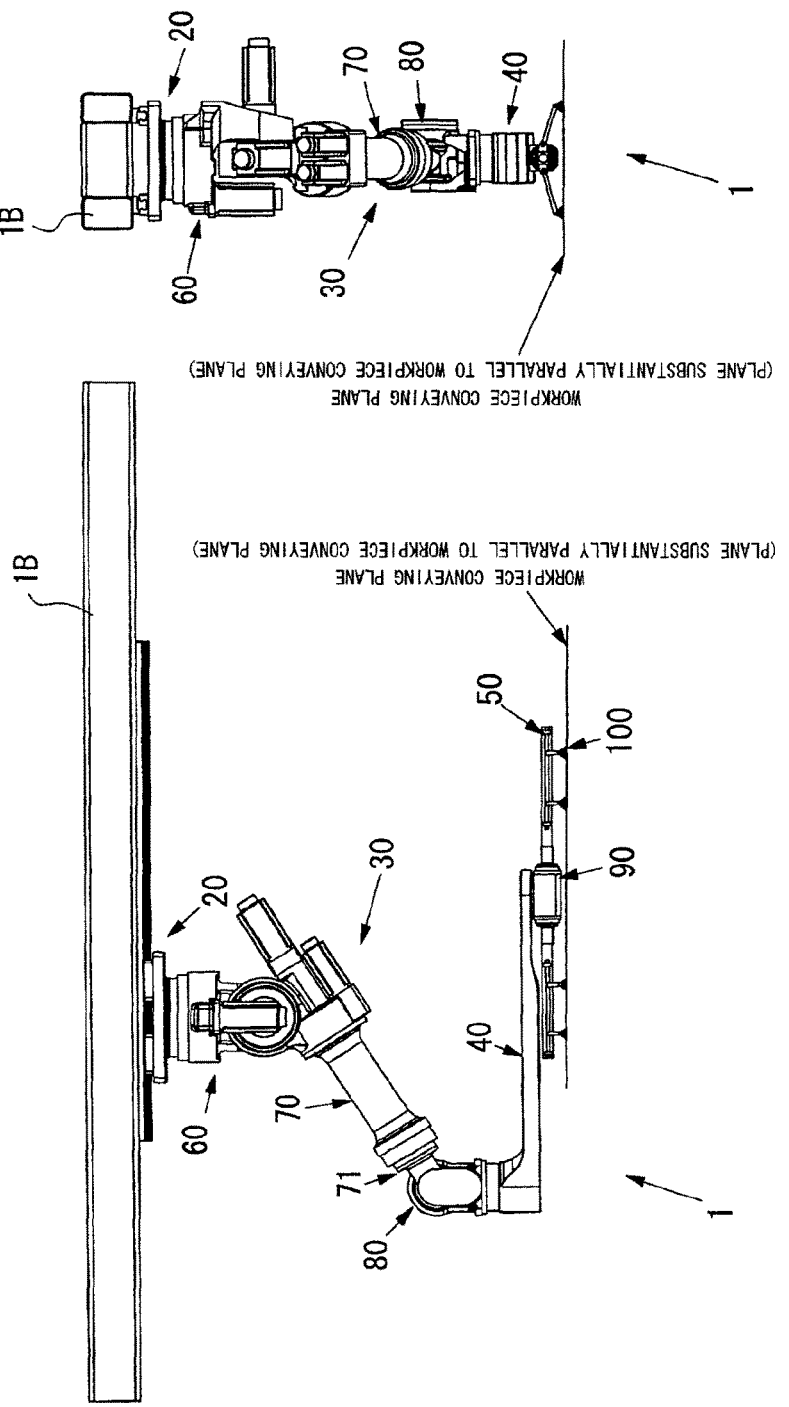

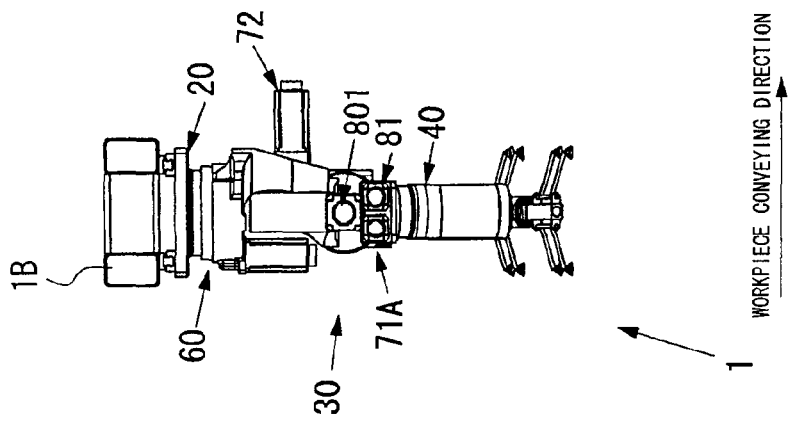
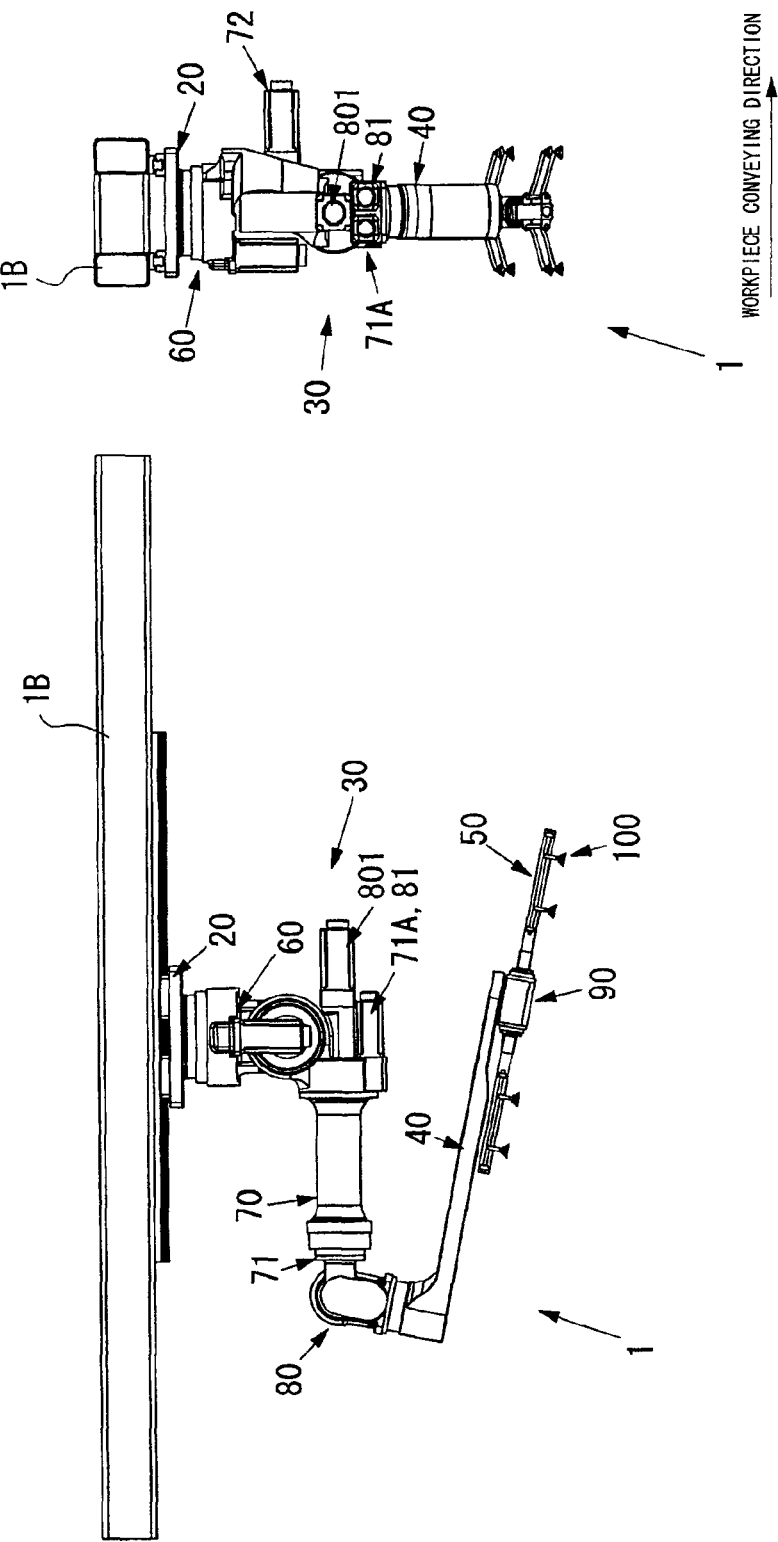

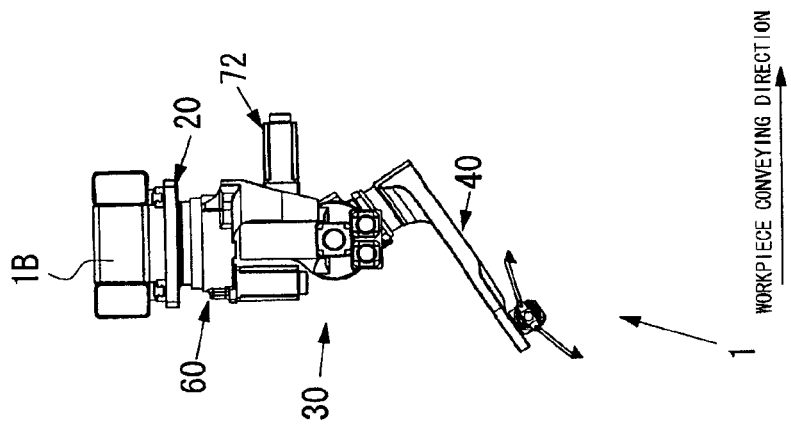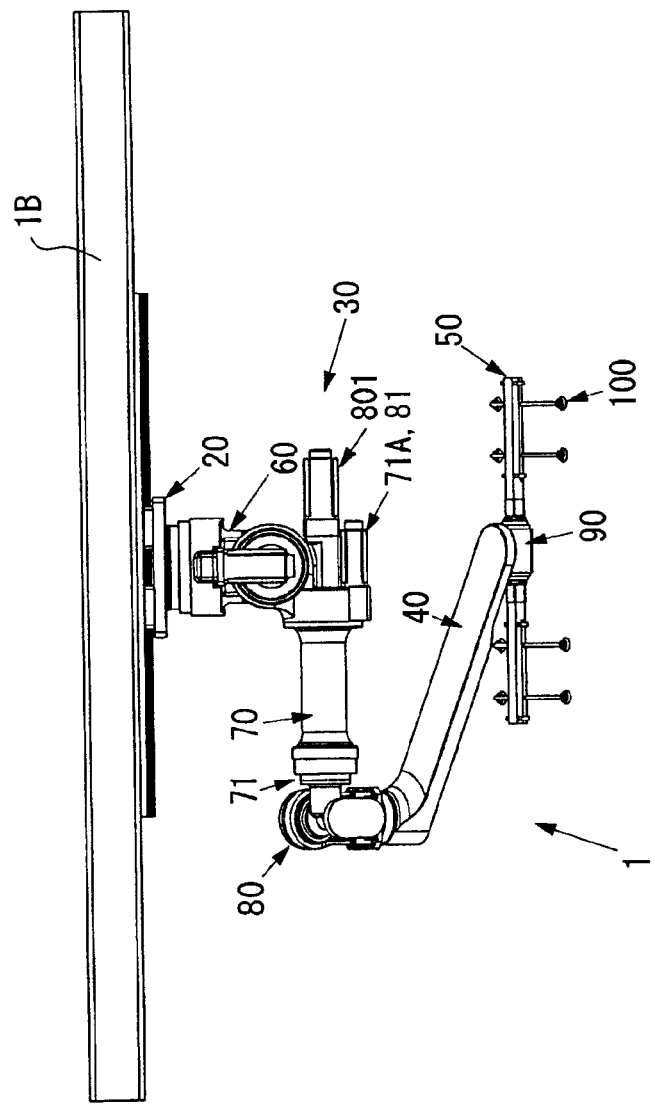

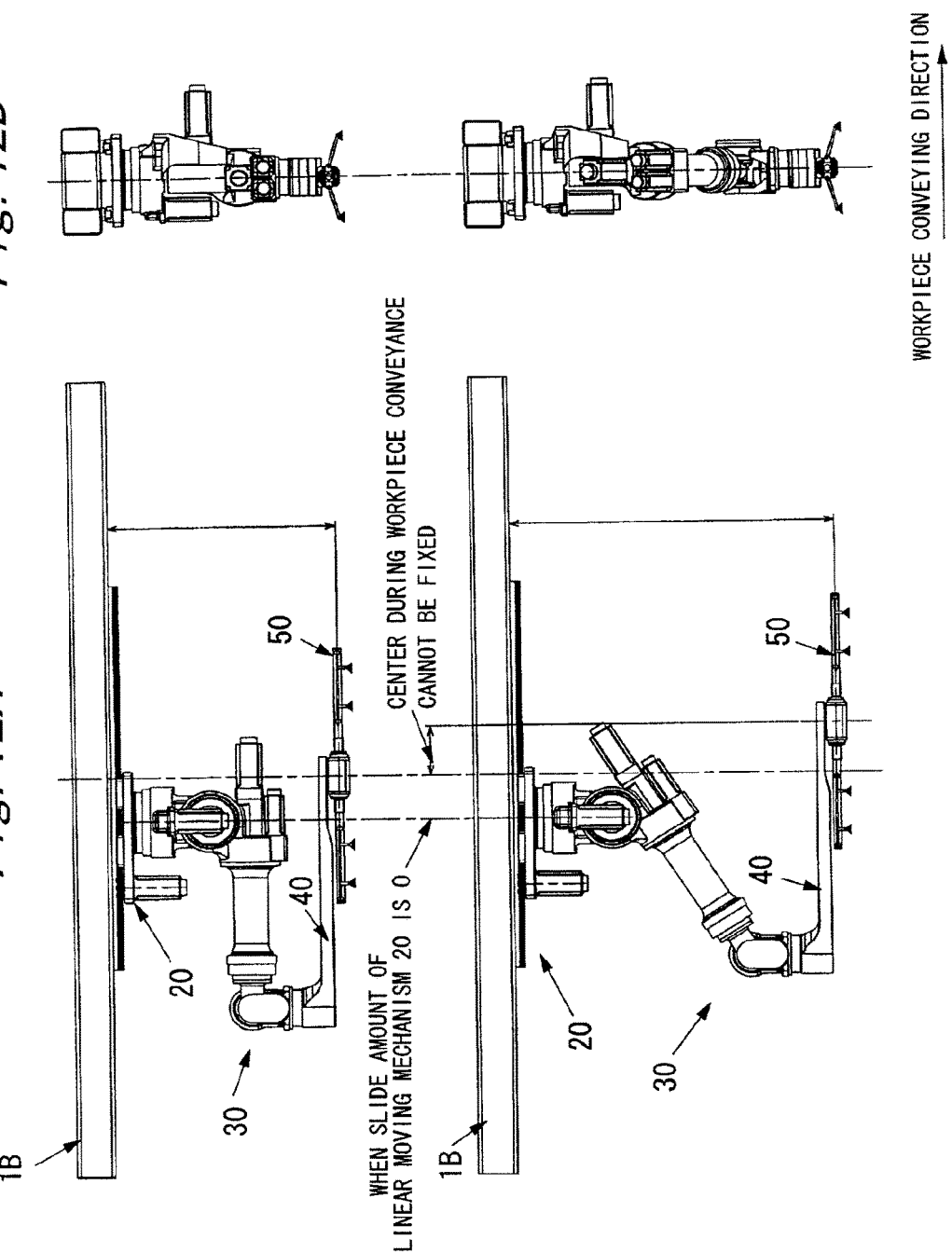

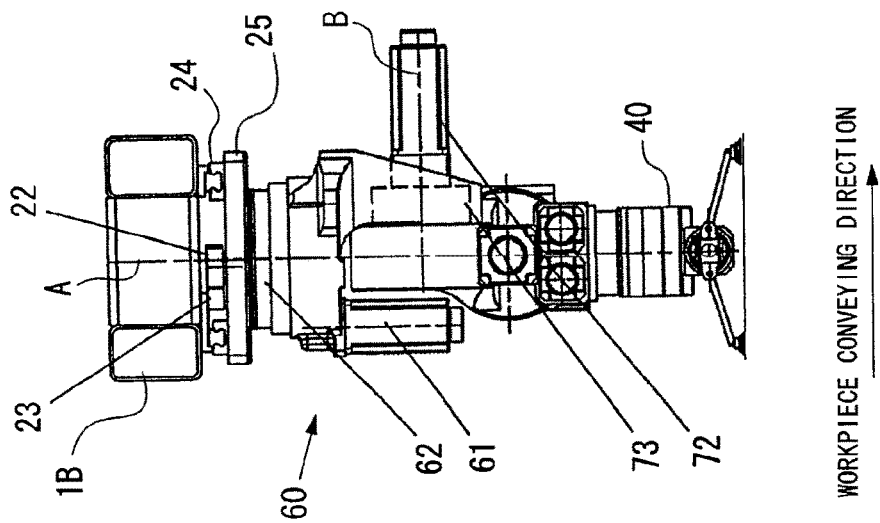
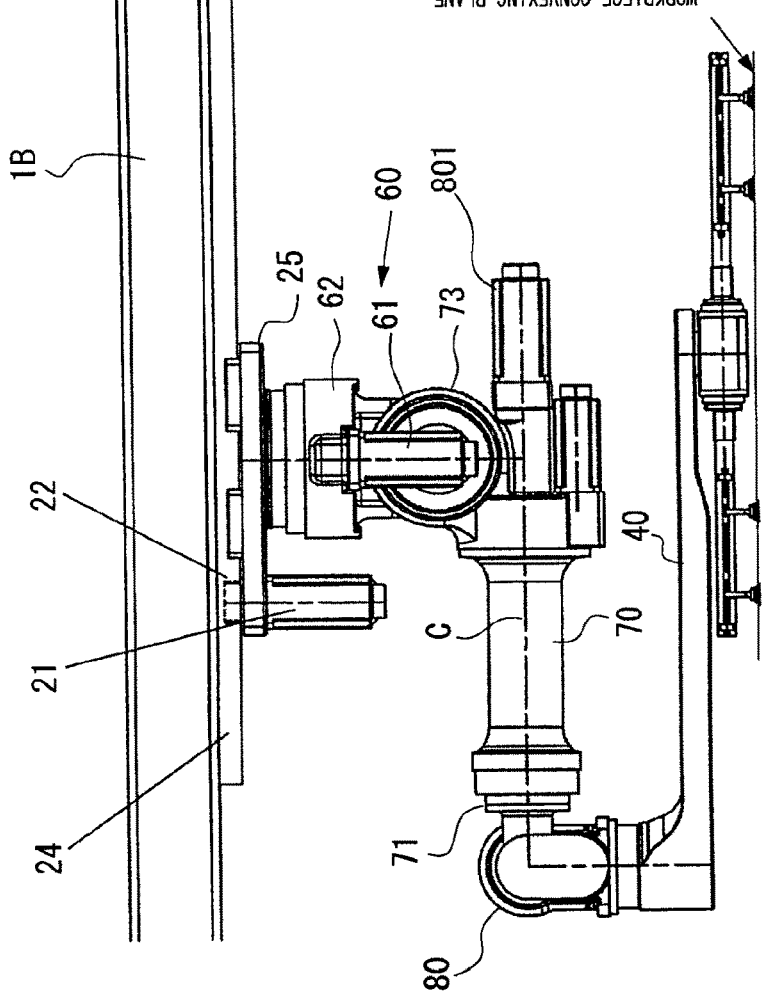

WORKPIECE CONVEYING APPARATUS FOR A PRESSING MACHINE

CROSS-REFERENCE TO RELATED APPLICATIONS

This Application claims priority to Japanese Patent Application No. 2014-174859 filed Aug. 29, 2014, the subject matter of which is incorporated herein by reference in entirety.

BACKGROUND OF THE INVENTION

Field of the Invention

The present invention relates to a workpiece conveying apparatus (workpiece conveying robot) for a pressing machine (press machine)

Background

Hitherto, there have been proposed various workpiece conveying apparatus configured to carry workpieces into and out of a press machine, or carry workpieces between the press machines.

For example, in Japanese Patent Application Laid-open No. 2009-95940, there is disclosed a workpiece conveying robot including, as illustrated in FIG. 17, a first arm that is horizontally rotatable, a second arm that is supported at a distal end of the first arm so as to be rotatable about an axis that is parallel to a rotation axis of the first arm, a flange that is arranged at a distal end portion of the second arm so as to be rotatable about an axis that is parallel to a rotation axis of the second arm, a workpiece holding portion provided to the flange, and a speed reduction mechanism having at least two output axes at the axis parallel to the rotation axis of the first arm.

In this context, during workpiece conveyance using the workpiece conveying robot as described above, workpiece holding means (workpiece holding portion) is moved to a predetermined position in a preceding step, specifically, a predetermined position in a lower die of a pressing machine, while avoiding interference with a slide that vertically moves (upper die). At the predetermined position, a moving-down operation (lowering operation) is performed so that the workpiece holding means comes close to and holds a workpiece. After the workpiece holding means holds the workpiece, a moving-up operation (raising operation) is performed, and the workpiece is taken out of the predetermined position in an upstream step (predetermined position in the lower die). Then, the workpiece holding means is moved to a predetermined position in a subsequent step, specifically, a predetermined position in a lower die of another pressing machine. At the predetermined position, the moving-down operation (lowering operation) is performed, and the workpiece is released. After the workpiece is released, the moving-up operation (raising operation) is performed, and the workpiece holding means is returned to the predetermined position in the preceding step. In this way, workpiece conveying operations are performed.

Thus, in the workpiece conveying robot described in Japanese Patent Application Laid-open No. 2009-95940, a ball screw is used so as to cause a swivel base, which supports the first arm so that the first arm is horizontally rotatable, to vertically move with respect to a base. With this, the workpiece holding means (workpiece holding portion) is vertically moved during the workpiece conveyance.

However, weight of a workpiece conveying robot to be used for conveying workpieces between generally assumed pressing machines such as pressing machines for automobile bodies is approximately two tons or more. Thus, as described in Japanese Patent Application Laid-open No. 2009-95940, in order to vertically move the entire workpiece conveying robot, in other words, all the arms by using the ball screw, vertical drive mechanisms having a high capacity and a high rigidity (including their drive sources) are needed. As a result, cost may be increased.

Further, in such a system, the workpiece conveying robot having great weight is vertically moved overall, and hence intense vibration and noise are generated. In addition, a rigidity of frames configured to support the workpiece conveying robot needs to be increased as a matter of course, and distal ends of the arms are unnecessarily intensely vibrated. In this way, in terms of practicality, such a system is not suited to high-speed workpiece conveyance.

Still further, in the workpiece conveying robot described in Japanese Patent Application Laid-open No. 2009-95940, it is desired that postures of the workpiece and the second arm, which are fixed within a horizontal plane, be changed, specifically, postures be inclined in directions other than the horizontal direction as far as interference with the upper die that vertically moves does not occur so as to increase a workpiece conveying speed as much as possible.

SUMMARY OF THE INVENTION

According to one embodiment of the present invention, there is provided a workpiece conveying apparatus for a pressing machine, including:

a rotary base configured to be mounted so as to be rotatable about a substantially perpendicular axis;

a first arm having a proximal end side that is pivotally supported by the rotary base so as to be rockable within a substantially perpendicular plane;

a coupler pivotally supported on a distal end side of the first arm so as to be rockable within a plane substantially parallel to a rocking plane of the first arm;

a second arm having a proximal end side that is mounted to the coupler so as to be rockable within a plane intersecting with a rocking plane of the coupler;

a cross bar mounted to a distal end side of the second arm so as to be rockable within a plane substantially parallel to a rocking plane of the second arm; and a workpiece holding device mounted to the cross bar.

According to one embodiment of the present invention, the rotary base may be installed so as to be movable in a direction substantially orthogonal to a workpiece conveying direction.

According to one embodiment of the present invention, the coupler may be mounted so as also to be turnable (or rotatable) about a major axis (or longitudinal axis) of the first arm.

According to one embodiment of the present invention, the cross bar may be mounted so as also to be tiltable in a direction intersecting with the rocking plane of the second arm.

According to one embodiment of the present invention, a mounting position of the workpiece holding device with respect to the cross bar may be shiftable.

BRIEF DESCRIPTION OF THE DRAWINGS

FIG. 5A to FIG. 5G are plan views for sequentially illustrating behavior (postures) of an articulated arm during workpiece conveyance by the workpiece conveying apparatus for a pressing machine along with the elapse of time (as viewed from an upper side of a workpiece conveying plane).

FIG. 6A is a front view for illustrating the behavior of the articulated arm during the workpiece conveyance by the workpiece conveying apparatus for a pressing machine, specifically, a posture (state) in which a workpiece is horizontally supported and lifted up relatively upward.

FIG. 6B is a side view of FIG. 6A.

FIG. 7A is another front view for illustrating the behavior of the articulated arm during the workpiece conveyance by the workpiece conveying apparatus for a pressing machine, specifically, a posture (state) in which the workpiece is horizontally supported and lowered relatively downward.

FIG. 7B is a side view of FIG. 7A.

FIG. 8A is still another front view for illustrating the behavior of the articulated arm during the workpiece conveyance by the workpiece conveying apparatus for a pressing machine, specifically, a posture (state) in which the workpiece is supported while being inclined at a predetermined angle as viewed in the workpiece conveying direction.

FIG. 8B is a side view of FIG. 8A.

FIG. 9A is yet another front view for illustrating the behavior of the articulated arm during the workpiece conveyance by the workpiece conveying apparatus for a pressing machine, specifically, a posture (state) in which the workpiece is supported while being inclined at a predetermined angle as viewed in the front direction orthogonal to the workpiece conveying direction.

FIG. 9B is a side view of FIG. 9A.

FIG. 12A is another front view for illustrating the posture (state) of the articulated arm when the workpiece conveying apparatus for a pressing machine does not use the linear moving mechanism, specifically, a front view for illustrating how the workpiece is conveyed while the conveying center of the workpiece is moved.

FIG. 12B is a side view of FIG. 12A.

FIG. 13A is a front view for illustrating an example of a structure of the articulated arm of the workpiece conveying apparatus for a pressing machine.

FIG. 13B is a side view of FIG. 13A.

DETAILED DESCRIPTION OF THE PREFERRED EMBODIMENTS

The present invention has been made in view of the circumstances as described above, and it is therefore an object of the present invention to provide a workpiece conveying apparatus for a pressing machine, which is capable of, by realizing a relatively simple, low-cost, lightweight, and compact structure, reducing vibration and noise, increasing a degree of freedom of posture of a workpiece during workpiece conveyance, and contributing to an increase in workpiece conveying speed, resulting in cycle time reduction and an increase in production efficiency.

Now, with reference to the accompanying drawings, description is made of a workpiece conveying apparatus for a pressing machine according to an exemplary embodiment of the present invention. Note that, the present invention is not limited to the embodiment described below.

Figure 1:
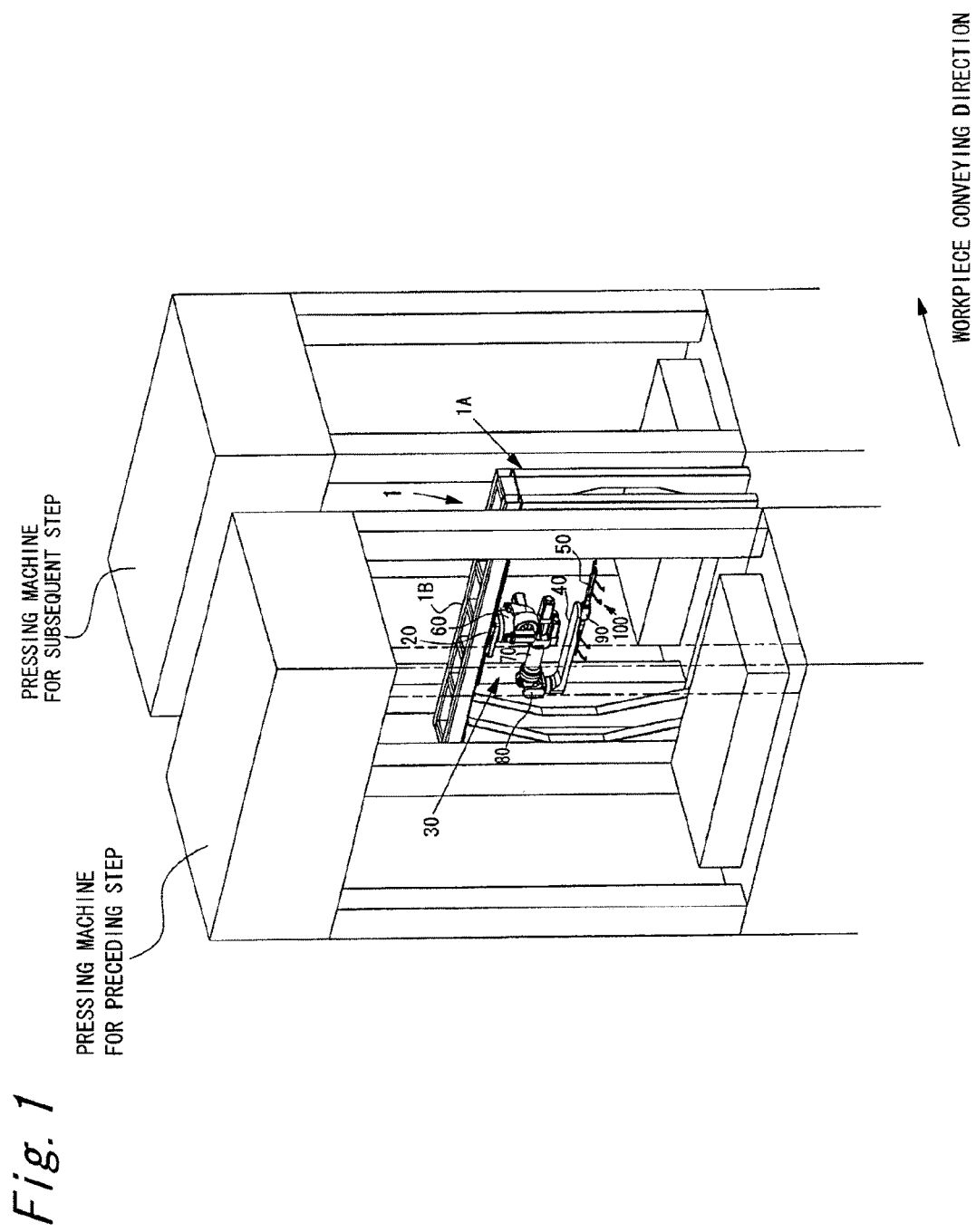
FIG. 1 is a perspective view for illustrating an overall configuration of a workpiece conveying apparatus for a pressing machine according to an embodiment of the present invention.
Figure 2:
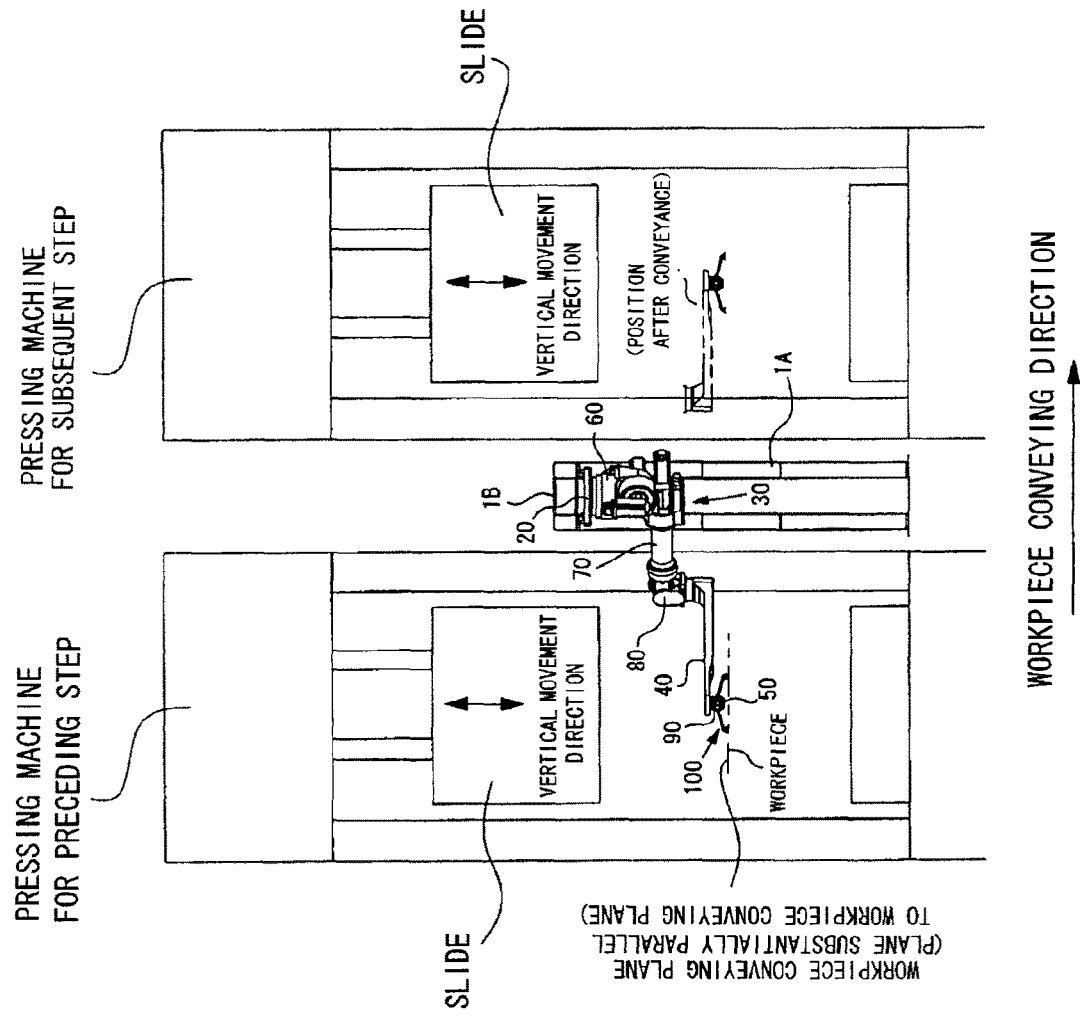
FIG. 2 is a front view for illustrating the overall configuration of the workpiece conveying apparatus for a pressing machine according to the embodiment (as viewed in a front direction orthogonal to a workpiece conveying direction).

As illustrated in FIG. 1 and FIG. 2, a workpiece conveying apparatus 1 for a pressing machine (such as a pressing machine for an automobile body) according to this embodiment is arranged between a pressing machine for a preceding step and a pressing machine for a subsequent step, and is used, for example, to receive a workpiece (such as a metal thin plate-like member) pressed by the pressing machine for the preceding step, and deliver the workpiece to the pressing machine for the subsequent step. Note that, the workpiece conveying apparatus 1 can be used also, for example, for conveying the workpiece from a workpiece storage place to the pressing machine for a first step, or conveying the workpiece from a pressing machine for a last step to a finished product storage place.

Figure 3:
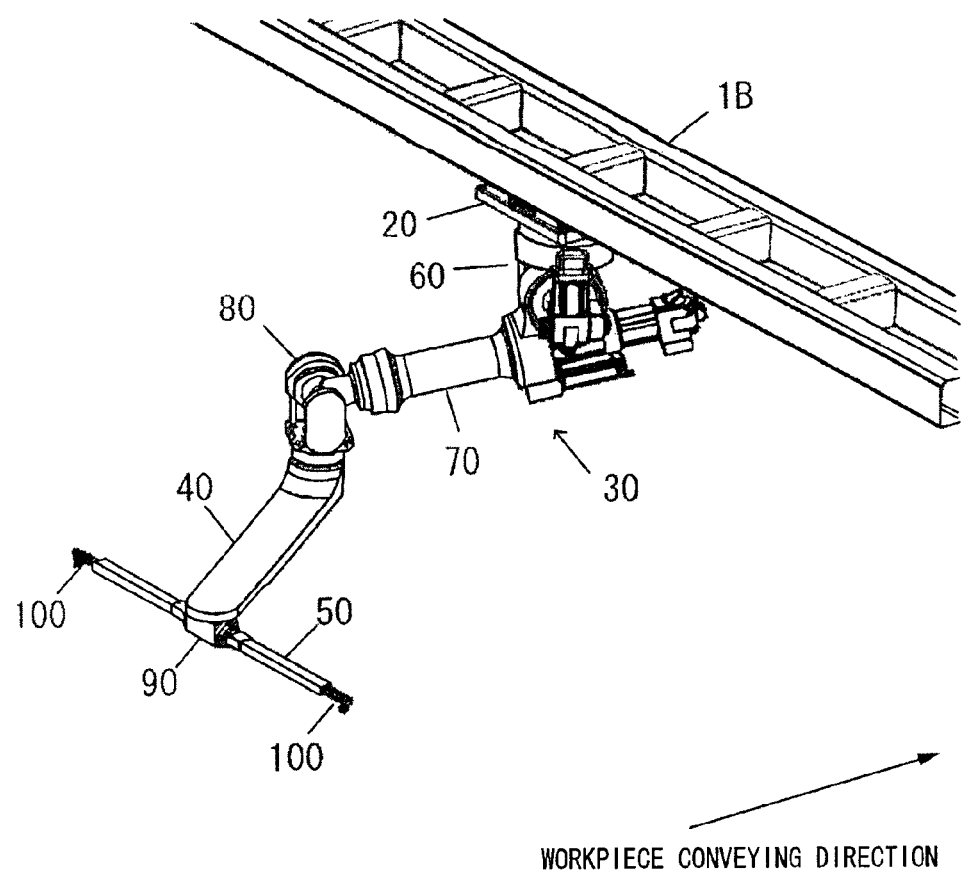
FIG. 3 is a perspective view for separately illustrating the workpiece conveying apparatus for a pressing machine.

As illustrated in FIG. 3, the workpiece conveying apparatus 1 according to this embodiment includes a base frame 1A (refer to FIG. 1 and FIG. 2), a linear moving mechanism 20, an articulated arm 30, a horizontal arm 40, and cross bars 50.

As illustrated in FIG. 1, the base frame 1A has such a gate shape (C-shape opened downward) that an upper horizontal beam 1B extending in a horizontal direction is installed in a direction substantially orthogonal to a workpiece conveying direction.

The base frame 1A may be selectively configured to stand alone as illustrated in FIG. 1, or mounted to a frame of an adjacent pressing machine. Note that, when the base frame 1A is of such a type as to be mounted to the frame of the adjacent pressing machine, the base frame 1A is not limited to the gate shape, and may be configured such that the upper horizontal beam 1B extending in the horizontal direction is directly mounted to the frame of the adjacent pressing machine.

Note that, when the base frame 1A is configured to stand alone, not only the base frame 1A but also the entire workpiece conveying apparatus 1 supported by the base frame 1A is unlikely to be influenced by vibration at the time of a pressing operation by the pressing machine. Thus, there is an advantage in that vibration, noise, and the like can be reduced.

As illustrated in FIG. 1 to FIG. 3, the linear moving mechanism 20 is installed in suspension from a lower side of the horizontal beam 1B of the base frame 1A, and is configured to be capable of horizontal movement along a longitudinal direction of the horizontal beam 1B. In other words, the linear moving mechanism 20 supports the articulated arm 30 so that the articulated arm 30 is freely turnable (or rotatable) about a perpendicular axis. With this, the articulated arm 30 can be (horizontally) moved in the direction substantially orthogonal to the workpiece conveying direction (refer to slide joint A1 of FIG. 4).

As an actuating mechanism for the linear moving mechanism 20, there may be used, for example, a linear guide configured to guide a linear shift, and a rotational-linear movement conversion mechanism configured to convert a rotational movement of a servo motor to a linear movement (such as a rack-and-pinion mechanism and a ball-screw mechanism). Alternatively, there may also be used a linear motor.

As illustrated in FIG. 3, the articulated arm 30 includes a rotary base 60, a drive arm 70, and a coupler 80 configured to couple the drive arm 70 and the horizontal arm 40 to each other.

The articulated arm 30 is moved without entering slide regions corresponding to projections of slides (vertically movable portions) of the pressing machines in a direction along a vertical moving direction of the slides (without overlapping with the slide regions). The sliding regions are indicated by reference symbol X in FIG. 5A.

Thus, the articulated arm 30 need not be reduced in thickness in a vertical direction so that, even when a workpiece conveying speed is increased, the articulated arm 30 does not interfere with the slides that vertically move. Thus, the articulated arm 30 can be increased in rigidity. As a result, for example, occurrence of vibration during the conveyance can be suppressed.

Figure 4:
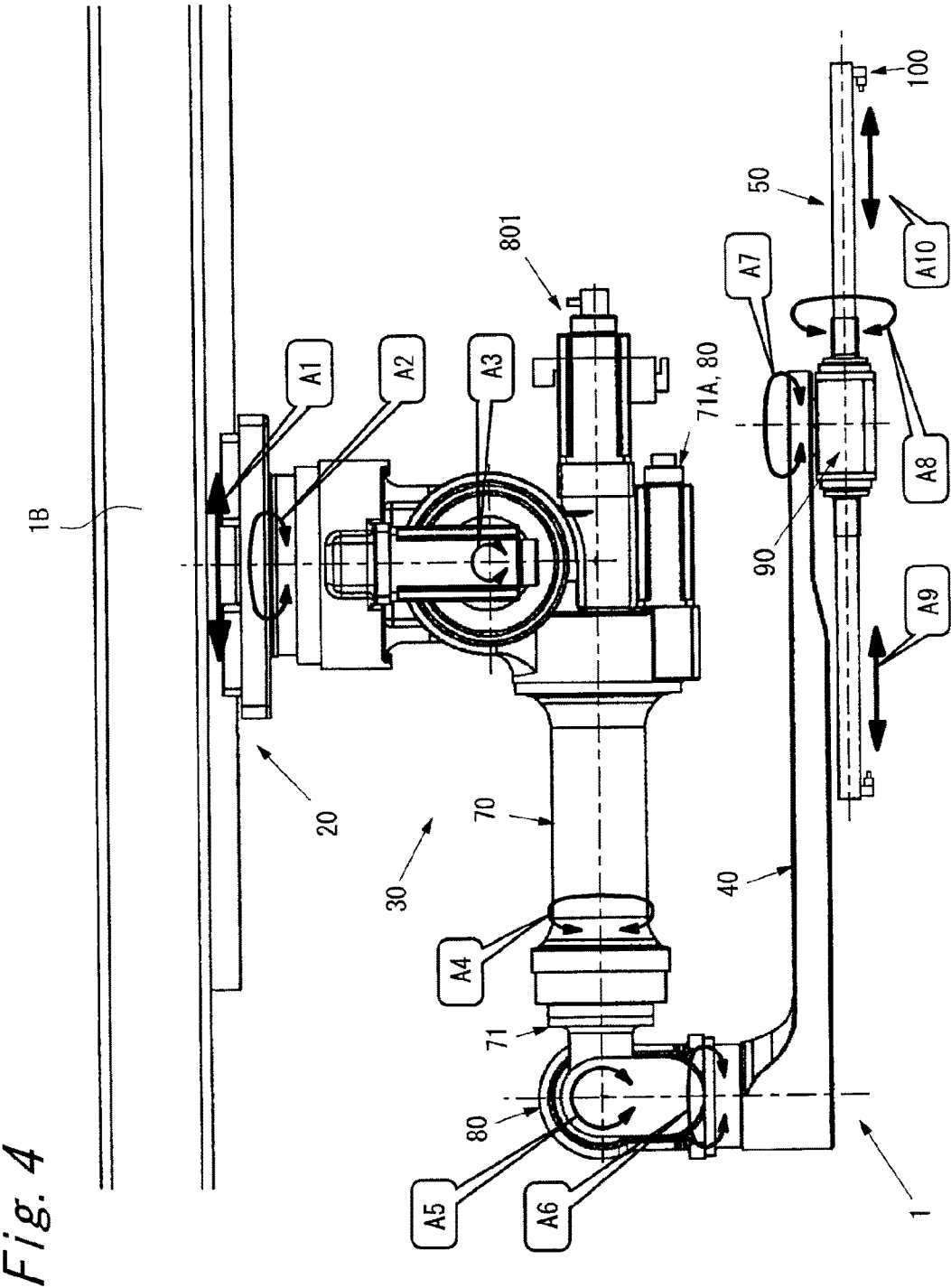
FIG. 4 is an explanatory front view for illustrating movements of portions (joints) of the workpiece conveying apparatus for a pressing machine.

As illustrated in FIG. 3, on a lower side of the linear moving mechanism 20, a proximal end side of the rotary base 60 is supported so as to be freely rotatable about a substantially perpendicular axis with respect not only to the linear moving mechanism 20 but also to the horizontal beam 1B of the base frame 1A (refer to rotary joint A2 of FIG. 4).

On a distal end side of the rotary base 60, the drive arm 70 is supported so as to be freely rockable in the vertical direction. In other words, a proximal end side of the drive arm 70 is pivotally supported (pivoted) about the distal end side of the rotary base 60 so as to be freely rockable within a predetermined perpendicular plane (refer to rotary joint A3 of FIG. 4).

Note that, the drive arm 70 corresponds to a first arm of the present invention.

As illustrated in FIG. 3, the servo motor or the like is arranged on the proximal end side of the drive arm 70, which is pivotally supported about (coupled to) the rotary base 60, and a distal end arm 71 configured to be turned about a major axis of a body of the drive arm 70 (refer to rotary joint A4 of FIG. 4) is arranged on a distal end side of the drive arm 70. In addition, the coupler 80 to be coupled to the horizontal arm 40 is arranged at a distal end of the distal end arm 71.

Note that, the coupler 80 to be coupled to the horizontal arm 40 is pivotally supported (pivoted) not only about the distal end arm 71 but also about the drive arm 70 so as to be freely turnable (rockable) within a predetermined plane (refer to rotary joint A5 of FIG. 4).

In other words, as illustrated in FIG. 3, the coupler 80 is mounted to the drive arm 70 so as to be turnable about the major axis of the drive arm 70 (refer to rotary joint A4 of FIG. 4), and pivotally supported (pivoted) so as to be freely turnable (rockable) within a plane substantially parallel to the rocking plane of the drive arm 70 (refer to rotary joint A5 of FIG. 4).

Note that, the coupler 80 needs to be pivotally supported so as to be rockable within the plane substantially parallel to the rocking plane of the drive arm 70 (refer to rotary joint A5 of FIG. 4), but the coupler 80 need not necessarily be mounted so as to be turnable about the major axis of the drive arm 70 (refer to rotary joint A4 of FIG. 4).

As illustrated in FIG. 3, the horizontal arm 40 is mounted through intermediation of the coupler 80 arranged on a distal end side of the articulated arm 30.

Note that, the horizontal arm 40 corresponds to a second arm of the present invention.

The coupler 80 is pivotally supported (pivoted) so as to be freely rockable within the predetermined plane, and the horizontal arm 40 coupled to the coupler 80 is supported (pivotally supported) at a distal end of the coupler 80 so as to be rockable within a plane intersecting with (substantially orthogonal to) the rocking plane of the coupler 80 (refer to rotary joint A6 of FIG. 4).

Further, as illustrated in FIG. 3, the cross bars 50 are supported on a distal end side of the horizontal arm 40, and the workpiece is held by workpiece holding devices 100 supported by the cross bars 50.

The horizontal arm 40 enters the slide regions corresponding to the projections of the slides (vertically movable portions) of the pressing machines in the direction along the vertical moving direction of the slides (overlaps with the slide regions). Thus, as illustrated, for example, in FIG. 4, the horizontal arm 40 is formed into such a flattened shape as to be reduced in width in the vertical direction in the slide regions.

With this, the horizontal arm 40 is unlikely to interfere with the slides that vertically move, which can contribute to an increase in workpiece conveying speed, resulting in cycle time reduction.

As illustrated in FIG. 3 and FIG. 4, the cross bars 50 are supported by the horizontal arm 40 through intermediation of a rotary tilt mechanism 90 arranged at the distal end portion of the horizontal arm 40.

The rotary tilt mechanism 90 supports the cross bars 50 so that the cross bars 50 are rotatable about a rotation axis substantially orthogonal to the rocking plane of the horizontal arm 40 (refer to rotary joint A7 of FIG. 4), and that the cross bars 50 are tiltable (inclinable) in such a direction as to intersect with the rocking plane of the horizontal arm 40 (refer to rotary joint A8 of FIG. 4).

The cross bars 50 may each include the workpiece holding device 100 configured to hold the workpiece, and a shifting device 52 (refer to FIG. 16) configured to shift the workpiece holding device 100 along a longitudinal direction of the cross bars 50 (refer to slide joints A9 and A10 of FIG. 4).

Note that, the shifting device 52 may be omitted, and the workpiece holding device 100 may be, for example, fixedly or manually moved (shifted) with respect to the cross bar 50.

The workpiece holding device 100 may be configured to freely hold and release the workpiece (such as a metal thin plate-like member) through, for example, vacuum suction or magnetic attraction.

The workpiece conveying apparatus 1 according to this embodiment configured as described above is operated as follows.

At the time of supplying (sending, or feeding) the workpiece from the pressing machine for the preceding step to the pressing machine for the subsequent step, the drive arm 70 is rocked (turned) downward about a pivot axis of the rotary base 60 within the predetermined perpendicular plane (refer to rotary joint A3 of FIG. 4), and/or the horizontal arm 40 is rocked (turned) downward about a pivot axis of the coupler 80 within the predetermined perpendicular plane (refer to rotary joint A5 of FIG. 4). With this, the workpiece holding devices 100 are lowered so as to hold the workpiece. Then, the above-mentioned rocking operations are performed upward so as to raise the workpiece holding devices 100 to a predetermined position. After that, the rotary base 60, the horizontal arm 40, and the rotary tilt mechanism 90 are rocked (turned) in conveying directions respectively within the horizontal planes (refer to rotary joints A2, A6, and A7 of FIG. 4) so that the workpiece is conveyed to a die of the pressing machine for the subsequent step (FIG. 5A to FIG. 5G).

After the workpiece is conveyed to a predetermined position of a lower die as described above, the drive arm 70 is rocked (turned) downward about the pivot axis of the rotary base 60 within the predetermined perpendicular plane (refer to rotary joint A3 of FIG. 4), and/or the horizontal arm 40 is rocked (turned) downward about the pivot axis of the coupler 80 within the predetermined perpendicular plane (refer to rotary joint A5 of FIG. 4). With this, the workpiece holding devices 100 are lowered so as to release and put the workpiece into the lower die. Then, the above-mentioned rocking operations are performed upward so as to raise the workpiece holding devices 100 to a predetermined position. After that, the rotary joints A2, A6, and A7 of FIG. 4 are operated in another predetermined order, that is, in the reverse order of from FIG. 5G to FIG. 5A so as to be moved to receive another workpiece in the pressing machine for the preceding step.

By repeating such operations, workpieces are conveyed from the pressing machine for the preceding step to the pressing machine for the subsequent step.

Note that, the cross bars 50 (workpiece holding devices 100) are moved in the vertical direction (refer to FIG. 6 and FIG. 7) through at least one of rocking (turning) of the drive arm 70 about the pivot axis of the rotary base 60 within the predetermined perpendicular plane (refer to rotary joint A3 of FIG. 4), or rocking (turning) of the horizontal arm 40 about the pivot axis of the coupler 80 within the predetermined perpendicular plane (refer to rotary joint A5 of FIG. 4).

Thus, in the workpiece conveying apparatus 1 according to this embodiment, unlike the related art, the entire workpiece conveying robot, in other words, all the arms need not necessarily be vertically moved by using linear motion mechanisms such as a ball screw. Thus, vertical drive mechanisms having a high capacity and a high rigidity (including their drive sources) need not be arranged, which can contribute to cost reduction.

Further, in the workpiece conveying apparatus 1 according to this embodiment, unlike the related art, the entire workpiece conveying robot, which has great weight, is not vertically moved. Thus, vibration and noise can be reduced. In addition, a rigidity of frames configured to support the workpiece conveying robot need not be set as high as those in the related art, and unnecessarily intense vibrations of distal ends of the arms are suppressed. In this way, the workpiece conveying apparatus 1 according to this embodiment is suited to high-speed workpiece conveyance and cycle time reduction.

Figure 10:
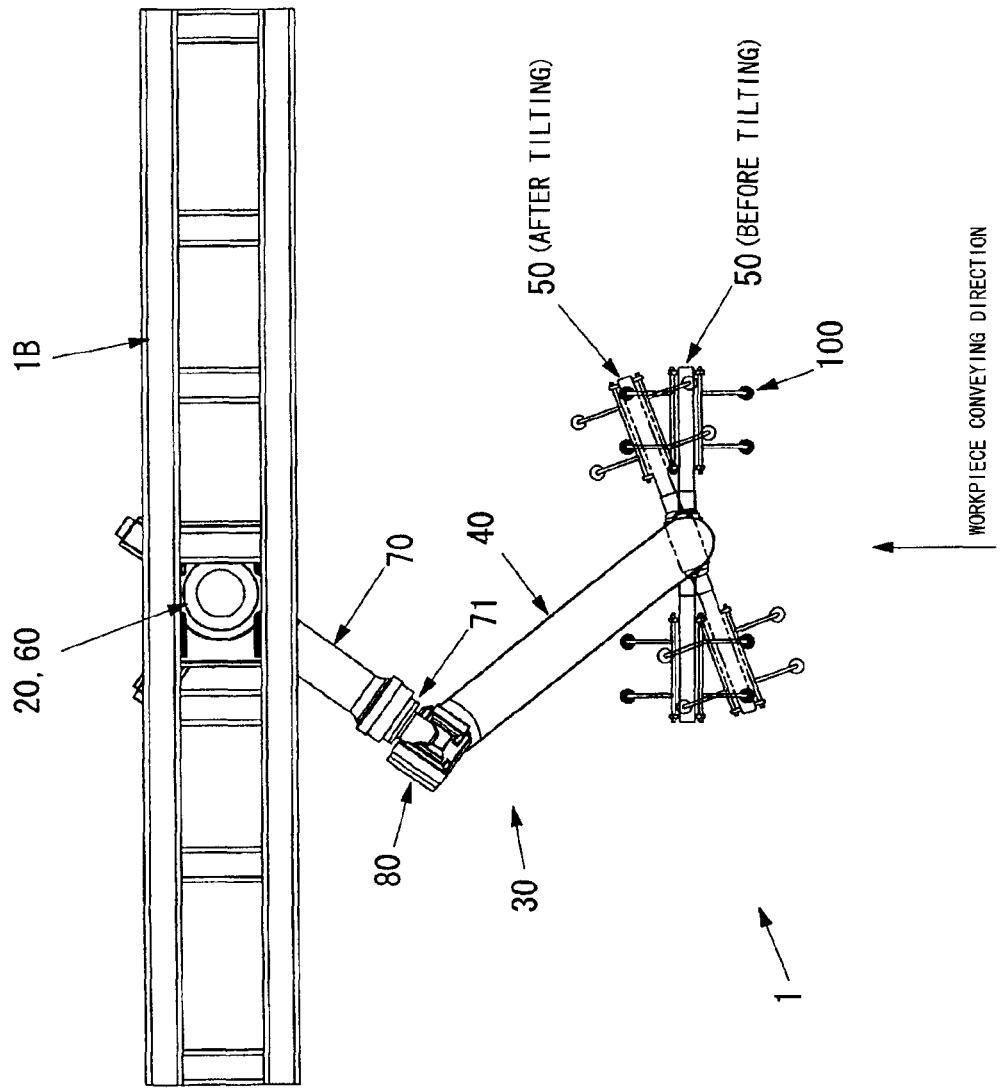
FIG. 10 is a top view for illustrating the behavior of the articulated arm during the workpiece conveyance by the workpiece conveying apparatus for a pressing machine, specifically, a posture (state) in which the workpiece is supported while being inclined (rocked) at a predetermined angle about an axis orthogonal to the workpiece conveying plane.

The cross bars 50 (workpiece holding devices 100) are capable of performing such tilting (inclining) operations that a plane along the conveying direction intersects with a horizontal plane (FIG. 8A and FIG. 8B), a plane substantially orthogonal to the conveying direction intersects with the horizontal plane (FIG. 9A and FIG. 9B), and that the cross bars 50 (workpiece holding devices 100) each tilt (rock) about an axis that intersects with a conveying plane (FIG. 10).

In this way, the cross bars 50 (workpiece holding devices 100) can be tilted with a high degree of freedom with respect to the horizontal arm 40, and hence a degree of freedom of posture of the workpiece during the workpiece conveyance can be significantly increased. Thus, at the time, for example, when the cross bars 50 (workpiece holding devices 100) enter the slide regions, posture control for avoiding interference with an upper die or the lower die can be facilitated, which can contribute to high-speed workpiece conveyance and cycle time reduction.

Note that, in this embodiment, as illustrated, for example, in FIG. 5A to FIG. 5G, the horizontal arm 40 and the cross bars 50 enter the slide regions in a manner that components on a proximal end side with respect to the horizontal arm 40 and the cross bars 50, such as the coupler 80, the drive arm 70, and the rotary base 60, do not enter the slide regions.

Thus, the coupler 80, the drive arm 70, the rotary base 60, and the like can each be manufactured to have a relatively high rigidity. With this, vibration and the like can be effectively suppressed, which can contribute to high-speed workpiece conveyance and cycle time reduction.

Further, the workpiece holding devices 100 may be shifted along the longitudinal direction of the cross bars 50 by a shift mechanism (such as a rack-and-pinion mechanism and a ball-screw mechanism) (refer to slide joints A9 and A10 of FIG. 4). Note that, the slide joints A9 and A10 may be shifted to the same side, or may be shifted to sides opposite to each other.

Note that, the linear moving mechanism 20 causes not only the cross bars 50 (workpiece holding devices 100) but also the workpiece conveying apparatus 1 to move within the horizontal plane substantially orthogonal to the workpiece conveying direction. With this, the cross bars 50 (workpiece holding devices 100) can be temporarily retreated from a press line, and hence work such as replacement with another type of cross bars placed on a tool replacement carriage can be facilitated.

Figures 11A, 11B:
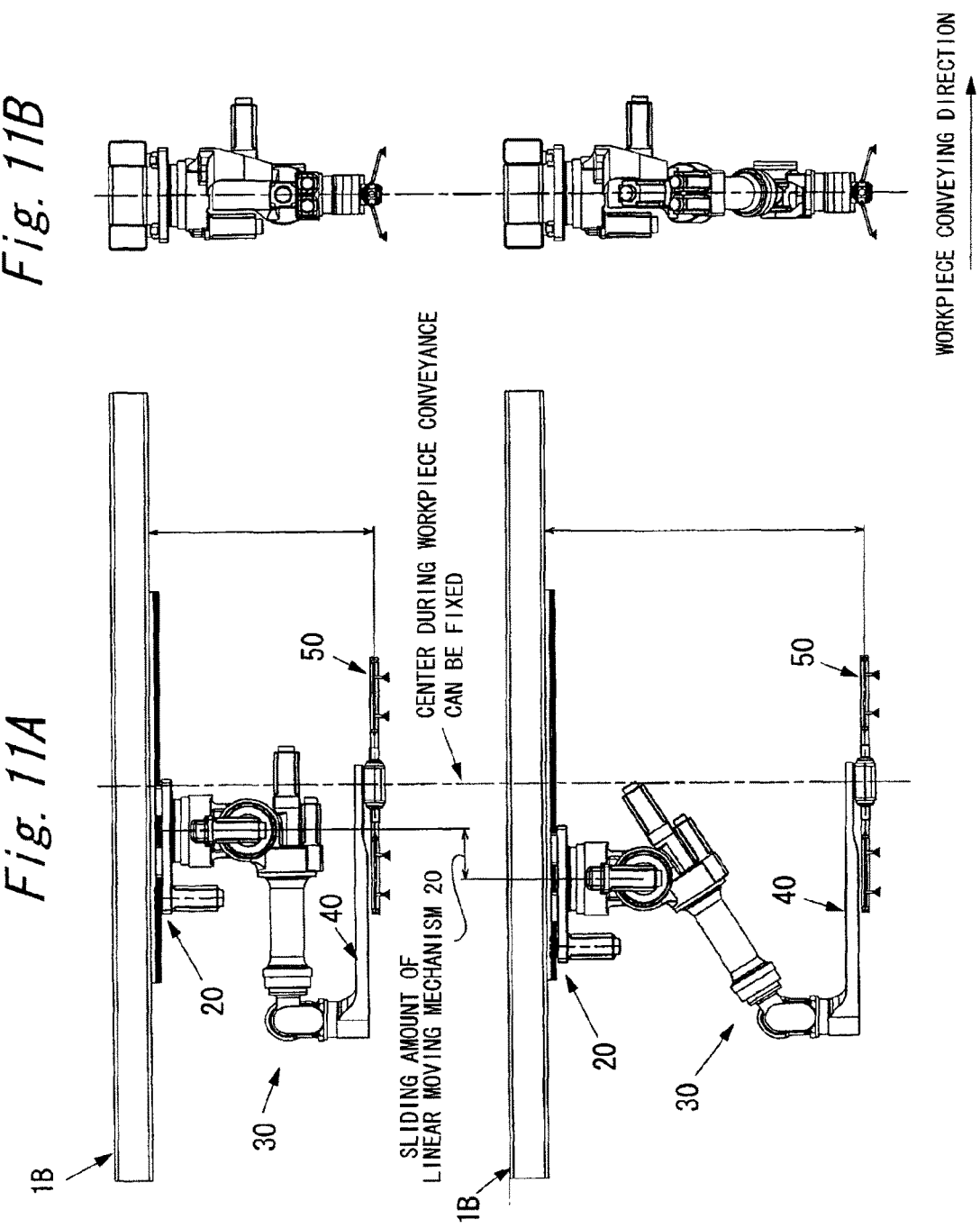
FIG. 11A is a front view for illustrating a posture (state) of the articulated arm when the workpiece conveying apparatus for a pressing machine moves cross bars within the horizontal plane substantially orthogonal to the workpiece conveying direction by using a linear moving mechanism, specifically, a front view for illustrating how the workpiece is conveyed while a conveying center of the workpiece is fixed.
FIG. 11B is a side view of FIG. 11A.

Further, in a case where the cross bars 50 (workpiece holding devices 100) are moved within the horizontal plane substantially orthogonal to the workpiece conveying direction by using the linear moving mechanism 20, even when the workpiece is vertically moved as illustrated in FIG. 11A and FIG. 11B, the workpiece can be conveyed while a conveying center of the workpiece is fixed. Thus, unnecessary inertial forces in directions other than the conveying direction are suppressed from being applied to the workpiece during the workpiece conveyance. With this, high-speed conveyance can be smoothly and stably performed.

Meanwhile, when the operation by the linear moving mechanism 20 is not used or when the linear moving mechanism 20 itself is not arranged, as illustrated in FIG. 12A and FIG. 12B, it is difficult to convey the workpiece while the conveying center of the workpiece is fixed during the workpiece conveyance. Thus, the unnecessary inertial forces in the directions other than the conveying direction are applied to the workpiece during the workpiece conveyance, which is disadvantageous in smoothly and stably performing high-speed conveyance.

Next, description is made of a specific configuration example of the workpiece conveying apparatus 1 according to this embodiment.

As illustrated in FIG. 13A and FIG. 13B, the linear moving mechanism 20 includes a pinion 22 configured to be driven and rotated by a servo motor 21, a rack 23 configured to mesh with the pinion 22, and a linear guide 24 configured to direct (guide) a linear motion (linear movement) of a base plate 25 supporting the rotary base 60. With this, the linear moving mechanism 20 can be moved in the directions A1 in FIG. 4. Note that, the pinion 22 and the rack 23 as drive sources may be replaced with the ball-screw mechanism or a linear motor.

The rotary base 60 includes a servomotor 61 and a speed reducer 62, and is configured to be turnable, by using the servo motor 61 and the speed reducer 62, about a rotation axis A (in the direction A2 in FIG. 4) with respect to the base plate 25.

The drive arm 70 includes a servo motor 72 and a speed reducer 73, and is pivotally supported (pivoted) on the distal end side (lower end side) of the rotary base 60 so as to be turnable, by using the servomotor 72 and the speed reducer 73, about a rotation axis B (in the direction A3 in FIG. 4).

The distal end arm 71 that is turned about a direction of the major axis (or longitudinal axis) of the body of the drive arm 70 (about the rotation axis C in FIG. 13A, in other words, direction A4 in FIG. 4) is arranged on a distal end side of the drive arm 70. The coupler 80 to be coupled to the horizontal arm 40 is arranged at the distal end of the distal end arm 71.

The distal end arm 71 includes a gear 71B configured to be driven and rotated by a servo motor 71A, and a speed reducer 71E configured to be driven and rotated through intermediation of a speed reducer input shaft 71D configured to be driven and rotated by a shaft 71C arranged integrally with the gear 71B. With this, the distal end arm 71 can be rotated about the rotation axis C in FIG. 14 (in the direction A4 in FIG. 4) relative to the body of the drive arm 70.

Figure 14:
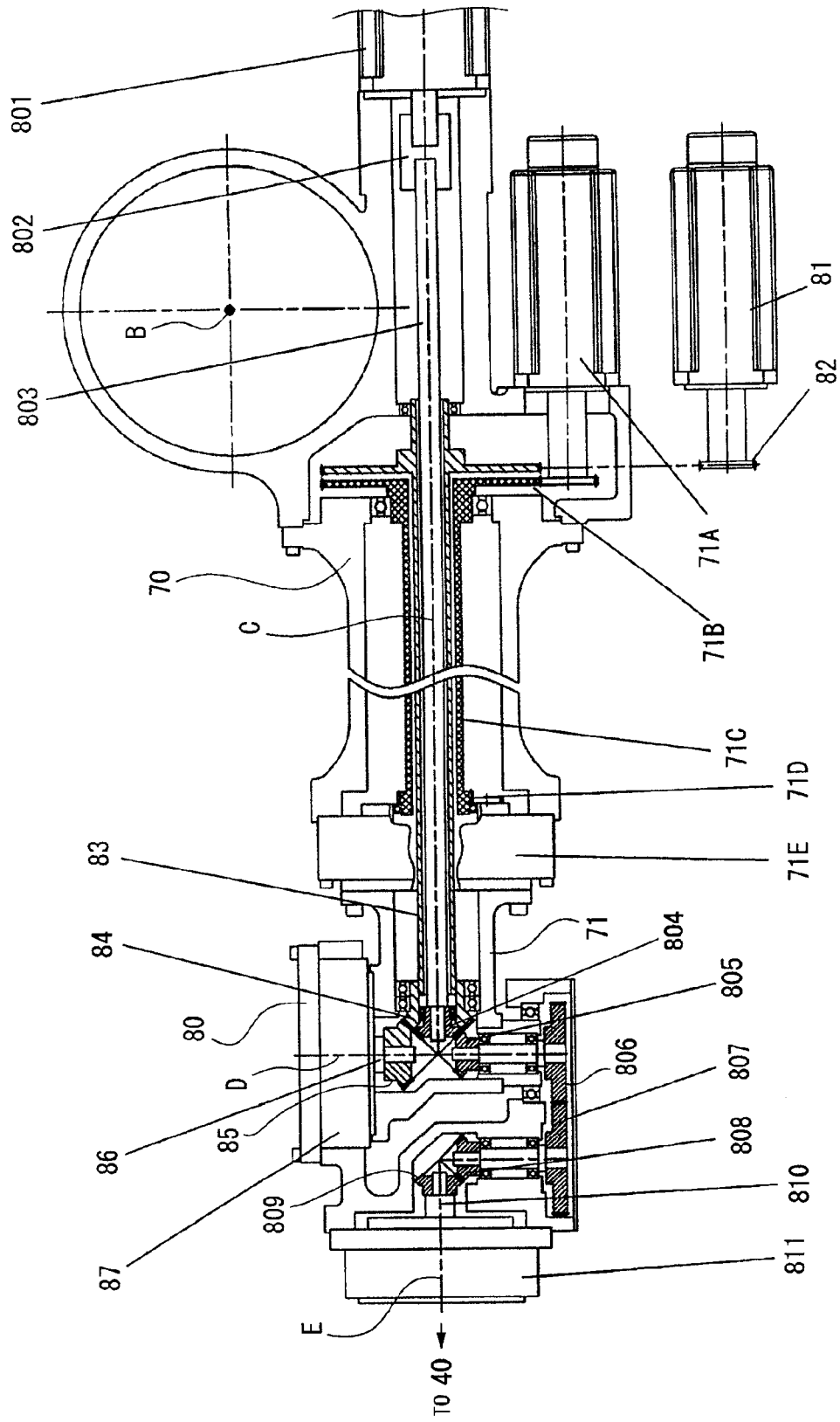
FIG. 14 is a sectional view for illustrating an example of a structure of a part corresponding to a drive arm and a coupler of the workpiece conveying apparatus for a pressing machine.

The coupler 80 to which the horizontal arm 40 is coupled is mounted to the distal end arm 71 so as to be freely turnable (rockable) about the rotation axis C in FIG. 14 (in the direction A5 in FIG. 4).

Further, the coupler 80 thus mounted can be freely turned (rocked) about the rotary axis D in FIG. 14 (in the direction A6 in FIG. 4) by driving and rotating a speed reducer 87 through intermediation of a speed reducer input shaft 86 arranged integrally with a bevel gear 85 configured to be driven and rotated by a bevel gear 84 mounted to a distal end of a shaft 83 configured to be driven and rotated by a servo motor 81 through intermediation of a gear 82. Note that, the shaft 83 is inserted through a hollow part of the gear 71B so as to be freely rotatable.

Incidentally, in FIG. 14, the servo motor 81, which is illustrated below the servo motor 71A for the sake of better understanding of the structure, is actually arranged behind the servo motor 71A (depth side in a direction perpendicular to the drawing sheet of FIG. 14).

Further, in this embodiment, a shaft 803 coupled to and rotated by a servo motor 801 through intermediation of a coupling 802 is inserted through a hollow part of the shaft 83 so as to be freely rotatable.

In addition, a bevel gear 804 is mounted to a distal end of the shaft 803 so that rotation is transmitted to another bevel gear 805 meshing with the bevel gear 804.

A drive gear 806 is coaxially mounted to the bevel gear 805, and still another bevel gear 808 is driven and rotated through intermediation of another drive gear 807 meshing with the drive gear 806. A speed reducer 811 is driven and rotated by a speed reducer input shaft 810 arranged integrally with yet another bevel gear 809 meshing with the bevel gear 808.

The speed reducer 811 is configured to be rotatable about the rotation axis E in FIG. 14 relative to a body of the coupler 80. With this, the horizontal arm 40 mounted to the speed reducer 811 can be turned (rocked) in the direction A6 in FIG. 4.

Figure 15:
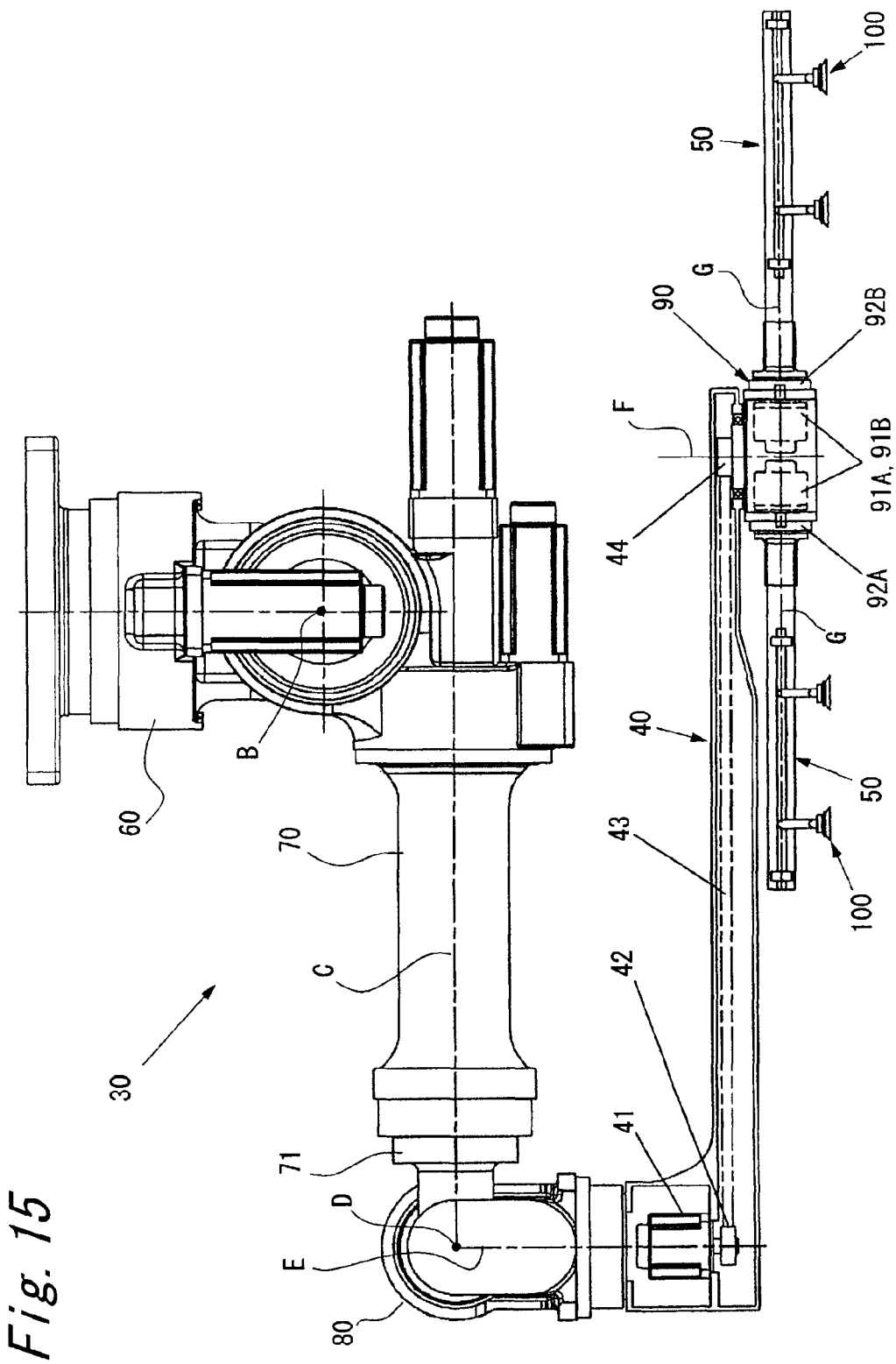
FIG. 15 is a front view for illustrating an example of a structure of a part corresponding to a horizontal arm and the cross bars of the workpiece conveying apparatus for a pressing machine.

As illustrated in FIG. 15, in the horizontal arm 40, a rotational force is transmitted from a pulley 42 configured to be driven and rotated by a servomotor 41 to another pulley 44 through intermediation of a toothed belt 43 looped around those pulleys. The pulley 44 is rotated about the rotation axis F in FIG. 15 (in the direction A7 in FIG. 4).

The rotary tilt mechanism 90 is mounted to the pulley 44. As illustrated in FIG. 15, the cross bars 50 are supported by the rotary tilt mechanism 90. With this, not only the rotary tilt mechanism 90 but also the cross bars 50 can be rotated about the rotation axis F in FIG. 15 (in the direction A7 in FIG. 4).

The rotary tilt mechanism 90 includes built-in servo motors 91A and 91B, and the cross bars 50 are respectively coupled to those motors through intermediation of speed reducers 92A and 92B. With this, the cross bars 50 can be turned (tilted, or inclined) about the rotation axis G in FIG. 15 (in the direction A8 in FIG. 4).

Figure 16:
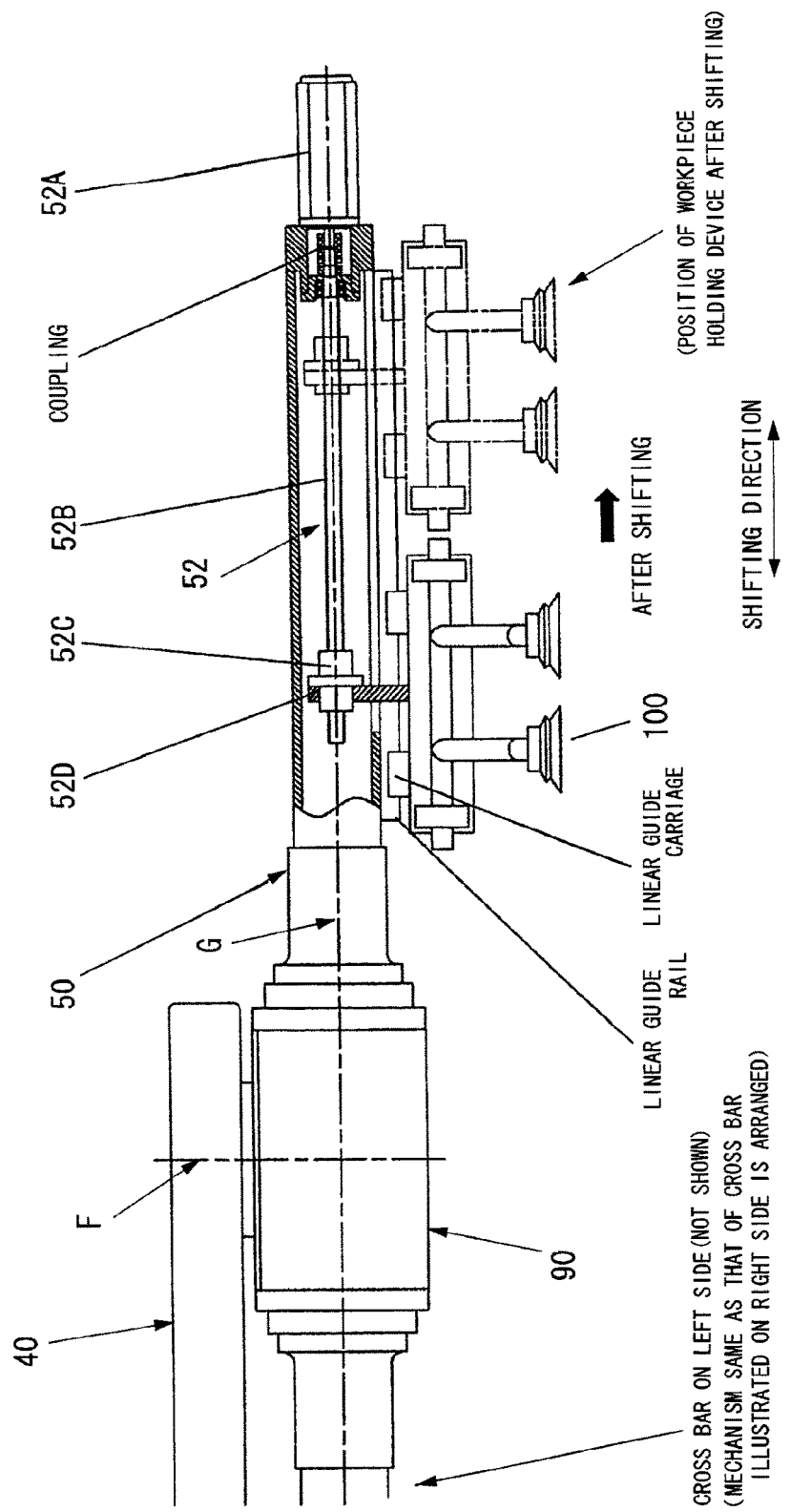
FIG. 16 is a sectional view for illustrating an example of a structure of a shifting device for the crossbar of the workpiece conveying apparatus for a pressing machine.
Figure 17:
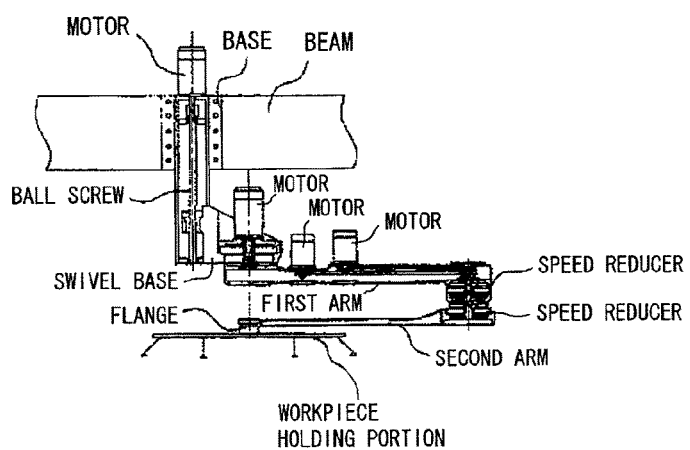
FIG. 17 is a view for illustrating an example of a related-art workpiece conveying apparatus for a pressing machine.

Further, as illustrated in FIG. 16, the cross bars 50 each include the shifting device 52 configured to move (shift) the workpiece holding device 100 along the longitudinal direction of the cross bar 50 (directions A9 and A10 in FIG. 4).

Note that, in the configuration example illustrated in FIG. 15, the shifting devices 52 are omitted, specifically, the workpiece holding devices 100 can be, for example, fixedly or manually moved (shifted) with respect to the cross bars 50.

As illustrated in FIG. 16, the shifting device 52 includes a servomotor 52A, a ball screw 52B configured to be driven and rotated by the servo motor 52A, a nut 52C threadedly engaged with the ball screw 52B, and a coupling block 52D configured to couple the nut 52C and the workpiece holding device 100 to each other. When the servo motor 52A is driven and rotated, the ball screw 52B is rotated so as to cause not only the nut 52C threadedly engaged with the ball screw 52B but also the coupling block 52D and the workpiece holding device 100 to be moved (shifted) along the longitudinal direction of the cross bar 50 (directions A9 and A10 in FIG. 4).

Note that, such a structure that the workpiece holding devices 100 are shifted to the same side (in-phase with each other) in the directions A9 and A10 in FIG. 4 with respect to the cross bars 50 may be employed. With this, a position of the workpiece can be shifted with respect to a distal end position of the horizontal arm 40. Thus, even when the linear moving mechanism 20 is omitted, the workpiece can be conveyed while the conveying center of the workpiece is fixed (refer to FIG. 11A and FIG. 11B). Therefore, the unnecessary inertial forces in the directions other than the conveying direction are not applied to the workpiece during the workpiece conveyance. With this, high-speed conveyance can be smoothly and stably performed.

As described above, according to the workpiece conveying apparatus 1 of this embodiment, the cross bars 50 (workpiece holding devices 100) are vertically moved through at least one of rocking (turning) one of the drive arm 70 about the pivot axis of the rotary base 60 within the substantially perpendicular plane (refer to rotary joint A3 of FIG. 4), or rocking (turning) of the horizontal arm 40 about the pivot axis of the coupler 80 within the substantially perpendicular plane (refer to rotary joint A5 of FIG. 4). Thus, unlike the related art, the entire workpiece conveying robot, in other words, all the arms need not necessarily be vertically moved by using the linear motion mechanisms such as a ball screw. Thus, the vertical drive mechanisms having a high capacity and a high rigidity (including their drive sources) need not be arranged, which can contribute to cost reduction.

Further, according to the workpiece conveying apparatus 1 of this embodiment, unlike the related art, the entire workpiece conveying robot, which has great weight, is not vertically moved. Thus, vibration and noise can be reduced. In addition, the rigidity of the frames configured to support the workpiece conveying robot need not be set as high as those in the related art, and unnecessarily intense vibrations of the distal ends of the arms are suppressed. Those advantages can contribute to high-speed workpiece conveyance and cycle time reduction.

Still further, according to the workpiece conveying apparatus 1 of this embodiment, the horizontal arm 40 enters the slide regions corresponding to the projections of the slides (vertically movable portions) of the pressing machines in the direction along the vertical moving direction of the slides (overlaps with the slide regions). Thus, as illustrated, for example, in FIG. 4, the horizontal arm 40 is formed into such a flattened shape as to be reduced in width in the vertical direction in the slide regions. With this, the horizontal arm 40 is unlikely to interfere with the slides that vertically move, which can contribute to an increase in workpiece conveying speed, resulting in cycle time reduction.

In other words, in the workpiece conveying apparatus 1 according to this embodiment, the articulated arm 30 on the proximal end side with respect to the horizontal arm 40 is configured not to enter the slide regions (not to overlap with the slide regions). Thus, the articulated arm 30 need not be reduced in thickness in the vertical direction so that, even when the workpiece conveying speed is increased, the articulated arm 30 is unlikely to interfere with the slides that vertically move. Thus, the articulated arm 30 can be increased in rigidity. As a result, for example, occurrence of the vibration during the conveyance can be effectively suppressed.

Further, in the workpiece conveying apparatus 1 according to this embodiment, the crossbars 50 (workpiece holding devices 100) can be tilted, and hence the degree of freedom of posture of the workpiece during the workpiece conveyance can be significantly increased. Thus, at the time, for example, when the cross bars 50 (workpiece holding devices 100) enter the slide regions, the posture control for avoiding interference with the upper die or the lower die can be facilitated, which can contribute to high-speed workpiece conveyance and cycle time reduction.

Still further, in the workpiece conveying apparatus 1 according to this embodiment, the servo motors 71A, 81, and 801, each having relatively great weight, are arranged near a turning axis on the proximal end side of the drive arm 70. Thus, rotational moments can be reduced, and a good weight balance can be maintained, which can contribute to facilitation and stabilization of posture control of the drive arm 70.

As described above, with the workpiece conveying apparatus 1 according to this embodiment, it is possible to provide the workpiece conveying apparatus for a pressing machine capable of, by realizing a relatively simple, low-cost, lightweight, and compact structure, reducing vibration and noise, increasing the degree of freedom of posture of the workpiece during the workpiece conveyance, and contributing to an increase in workpiece conveying speed, resulting in cycle time reduction and an increase in production efficiency.

Namely, according to the one embodiment of the present invention, it is possible to provide the workpiece conveying apparatus for a pressing machine, which is capable of, by realizing a relatively simple, low-cost, lightweight, and compact structure, reducing the vibration and noise, increasing the degree of freedom of posture of the workpiece during the workpiece conveyance, and contributing to the increase in workpiece conveying speed, resulting in the cycle time reduction and the increase in production efficiency.

Note that, although the workpiece conveying apparatus 1 is arranged between the pressing machine for the preceding step and the pressing machine for the subsequent step in the case described in this embodiment, the present invention is not limited thereto. The present invention is applicable also to such a case that the workpiece conveying apparatus 1 is arranged between a preform (blank) storage place and a first pressing machine in a press line, or between a pressing machine for a last step in the press line and a finished product storage place.

Further, although the horizontal beam 1B of the base frame 1A is extended in the direction substantially orthogonal to the workpiece conveying direction in the case described in this embodiment, the present invention is not limited thereto. The present invention is applicable also to a case where the horizontal beam 1B is arranged along the workpiece conveying direction, and a case where the horizontal beam 1B is arranged in a direction intersecting with the workpiece conveying direction at a predetermined angle.

Still further, although the workpiece conveying apparatus 1 is installed on the lower side of the horizontal beam 1B in the case described in this embodiment, the present invention is not limited thereto. The present invention is applicable also to a case where the horizontal beam 1B is lowered and the workpiece conveying apparatus 1 is installed on the horizontal beam 1B.

Yet further, although the shifting devices 52 are arranged in the case described in this embodiment so that the workpiece holding devices 100 can be shifted along the longitudinal direction of the cross bars 50, the present invention is not limited thereto. The shifting devices 52 may be omitted, and the workpiece holding devices 100 may be, for example, fixedly or manually moved (shifted) with respect to the cross bars 50.

The embodiment described above is merely an example for describing the present invention, and various modifications may be made without departing from the gist of the present invention.

What is claimed is:

1. A workpiece conveying apparatus for conveying a workpiece in a conveying direction to a pressing machine, comprising:
 a rotary base rotatable about a first axis extending substantially perpendicular to the conveying direction;
 a first arm having a proximal end that is pivotally supported by the rotary base so as to be rockable within a first plane two-dimensionally extending substantially along the first axis and a first direction substantially perpendicular to the conveying direction and the first axis;
 a coupler pivotally supported on a distal end of the first arm so as to be rockable within a second plane substantially parallel to the first plane;
 a second arm having a proximal end that is mounted to the coupler so as to be rockable within a third plane intersecting with the second plane;
 a cross bar mounted to a distal end of the second arm so as to be rockable within a fourth plane substantially parallel to the third plane; and
 a workpiece holding device mounted to the cross bar for holding the workpiece, wherein
 the first axis extends through a coupling portion between the rotary base and the first arm from a top to a bottom of the workpiece conveying apparatus,
 the rotary base, the first arm, and the second arm being arranged from the top to the bottom of the workpiece conveying apparatus in that order along the first axis, and
 the second arm has a distal end positioned at a side opposite to the proximal end mounted to the coupler, relative to the first axis.

2. The workpiece conveying apparatus according to claim 1, wherein the coupler is mounted so as also to be turnable about a major axis of the first arm.

3. The workpiece conveying apparatus according to claim 1, wherein the cross bar is mounted so as also to be tiltable in a direction intersecting with the rocking plane of the second arm.

4. The workpiece conveying apparatus according to claim 1, wherein a mounting position of the workpiece holding device with respect to the cross bar is shiftable.

5. The workpiece conveying apparatus according to claim 1, wherein a movable range of the rotary base in the first direction is limited between columns of the pressing machine.

* * * * *